US005472223A

United States Patent [19]
Hawthorne et al.

[11] Patent Number: 5,472,223
[45] Date of Patent: Dec. 5, 1995

[54] AIR OPERATED FIFTH WHEEL

[75] Inventors: V. Terrey Hawthorne, Lisle; John W. Kaim, Chicago, both of Ill.

[73] Assignee: AMSTED Industries Incorporated, Chicago, Ill.

[21] Appl. No.: 160,022

[22] Filed: Nov. 30, 1993

[51] Int. Cl.$^6$ .................................................. B62D 53/10
[52] U.S. Cl. ........................................ 280/437; 280/434
[58] Field of Search .................................. 280/433, 434, 280/437, 432, 436

[56] References Cited

U.S. PATENT DOCUMENTS

| | | | |
|---|---|---|---|
| 2,471,854 | 5/1949 | Bies et al. | 280/433 |
| 3,888,514 | 6/1975 | Klein | 280/434 |
| 4,871,182 | 10/1989 | Altherr et al. | 280/434 |
| 5,137,298 | 8/1992 | Madura | 280/434 |
| 5,176,396 | 1/1993 | Hawthorne et al. | 280/434 |
| 5,257,796 | 11/1993 | Thorwall et al. | 280/434 |

FOREIGN PATENT DOCUMENTS

| | | | |
|---|---|---|---|
| 0671936 | 10/1989 | Switzerland | 280/436 |
| 1407084 | 9/1975 | United Kingdom | 280/434 |
| 2160163 | 12/1985 | United Kingdom | 280/434 |

*Primary Examiner*—Margaret A. Focarino
*Assistant Examiner*—F. Zeender
*Attorney, Agent, or Firm*—Edward J. Brosius; F. S. Gregorczyk

[57] ABSTRACT

An accessory fluid cylinder and cam apparatus mounted under a fifth wheel, which is both manually operable or energizable by a tractor air system to enable a driver to automatically and remotely release the safety latch and unlock the fifth wheel jaw to release a trailer king pin when the tractor parking brake is engaged.

15 Claims, 7 Drawing Sheets

AIR OPERATED FIFTH WHEEL

FIELD OF THE INVENTION

The present invention relates to fifth wheels for over the road tractors and more particularly to an improved power operated apparatus for unlocking the connection to a trailer.

BACKGROUND OF THE INVENTION

This invention is an improvement upon the apparatus taught and illustrated in U.S. Pat. No. 4,871,182 to Altherr et al., which disclosure is incorporated herein by reference. Further, this application refers to and is an improvement on an invention taught in U.S. Pat. No. 5,176,396 to Hawthorne et al. for a fifth wheel unlocking device with fluid power redundancy.

Fifth wheel devices include a plate which supports the forward bed of a trailer. A kingpin is generally affixed to the trailer bed and extends into a center opening of the fifth wheel plate. Fifth wheels have included a pivotally connected jaw to engage and hold the kingpin against horizontal and vertical withdrawal. Generally the jaw closes and locks on the kingpin as the tractor and trailer are brought together. However, there is a mechanism provided to unlock the jaw to permit horizontal release of the kingpin and to allow for separation of the tractor and trailer, that is when the trailer is stationary and the tractor is thereafter powered forward. The mechanism is generally operable by the tractor driver and includes safeguards to avoid accidental release.

There have been earlier designs for automatically unlatching fifth wheels, for example the device shown and illustrated in U.S. Pat. No. 2,471,854 to Bies et al. However, experience with over the road hauling during the last several decades has developed an abundance of caution against automatically operated fifth wheels and, largely for reasons of safety, the tractor-trailer industry has generally disdained power-released mechanisms for tractor-trailer separation. Thus modern over the road fifth wheels, such as that shown in U.S. Pat. No. 4,871,182 to Altherr et al., have incorporated locking features, which are solely manually operable from the exterior of the tractor cab. These locking/unlocking features and devices have previously not been regarded as suitable for powered operation. However, as trucks have tended to become larger in size and incorporated aerodynamic design features, it has become more difficult for the operator to reach, grasp and operate the actuating mechanism for the fifth-wheel lock, and the problem is exaggerated and exacerbated for persons of smaller stature. Further, even taller individuals have difficulty with manual operation of the fifth-wheel disengaging apparatus without soiling and tearing clothing, and they may sustain physical impairments, such as back sprains and the like.

SUMMARY OF THE INVENTION

The present invention provides a highway truck fifth wheel with a fluid powered operator for disengagement of the locking means including the safety latch. This apparatus provides means to obviate manual operation of the disengaging apparatus and more specifically permits remote activation of the jaw unlocking mechanism, which retains or blocks the kingpin in the fifth wheel. This powered apparatus is redundant and operable to override the manually operable unlocking mechanism.

The present invention utilizes a locking rod-locking lever combination having an over the top extension of the locking rod, which combination is movable and actuatable by a fluid-operated power device. The unique assembly or configuration of the locking rod in combination with the camming action and rotation of the power device provides a means and apparatus to unlock the kingpin from the fifth wheel by engagement of juxtaposed camming or sloped surfaces at the intersection of the upper rod and locking portion, and the safety latch mechanism of the fifth wheel skirt.

BRIEF DESCRIPTION OF THE DRAWINGS

In the several figures of the drawings, like reference numerals identify like components, and in the drawings.

DETAILED DESCRIPTION OF THE PREFERRED EMBODIMENT

Figure 1:
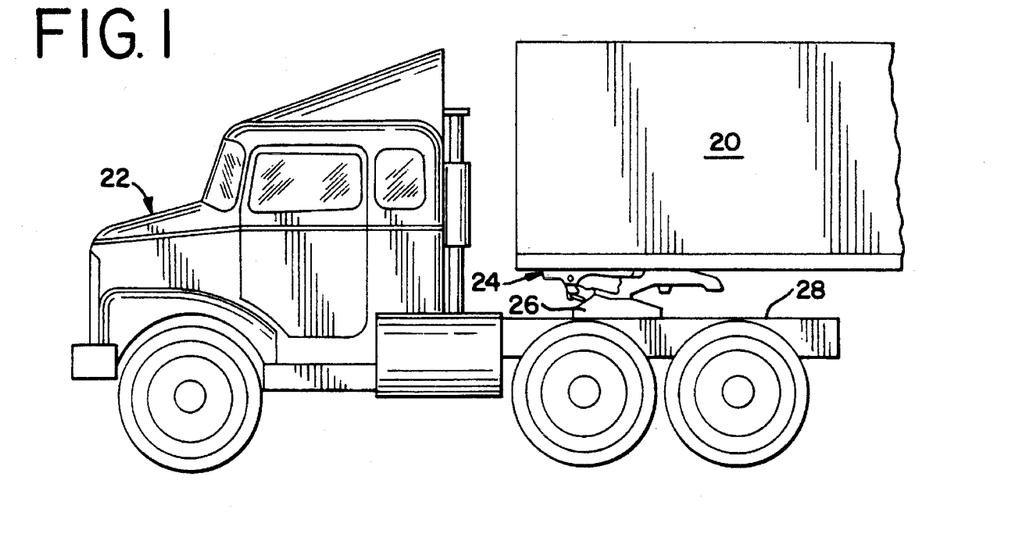
FIG. 1 is a side view of a tractor and trailer with a fifth wheel mounting.

An over-the-road trailer 20 and tractor 22 arrangement is shown in FIG. 1, which trailer 20 and tractor 22 are coupled at fifth wheel 24. The structure illustrated in FIGS. 2–6 is similar to illustrations of the structure taught in U.S. Pat. No. 5,176,396, which patent is incorporated by reference herein. The environment of and an exemplary structure for a remotely-actuated automatic unlocking mechanism for fifth wheels are noted in the U.S. Pat. No. 5,176,396. In that '396 patent, FIG. 7 shows a control circuit for a fluid operated actuator or motor. However, a plurality of fifth wheel structures will not accommodate the apparatus disclosed in the '396 patent. The present invention provides a novel unlatching and structural arrangement, and a distinctly different assembly of operating components for automatically operating the latching and locking mechanism of a tractor-trailer fifth wheel.

Figure 2:
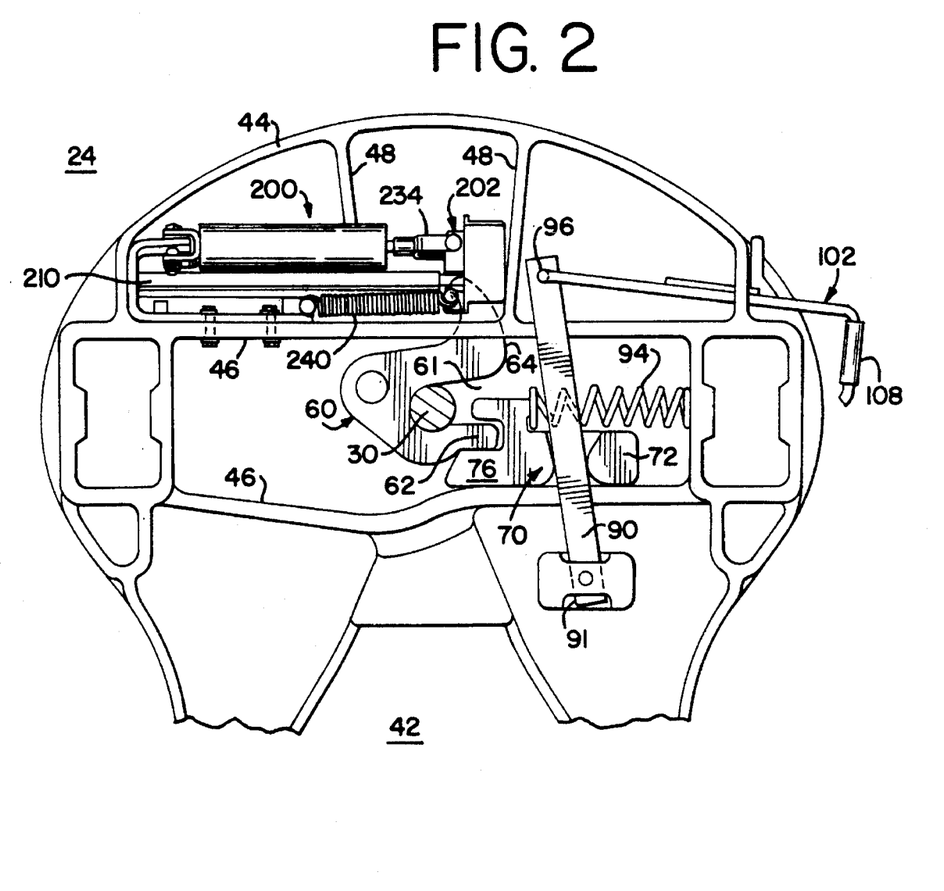
FIG. 2 is a bottom plan view of a fifth wheel incorporating a cam retractor and a jaw in a first closed and locked position.
Figures 3, 4, 7:
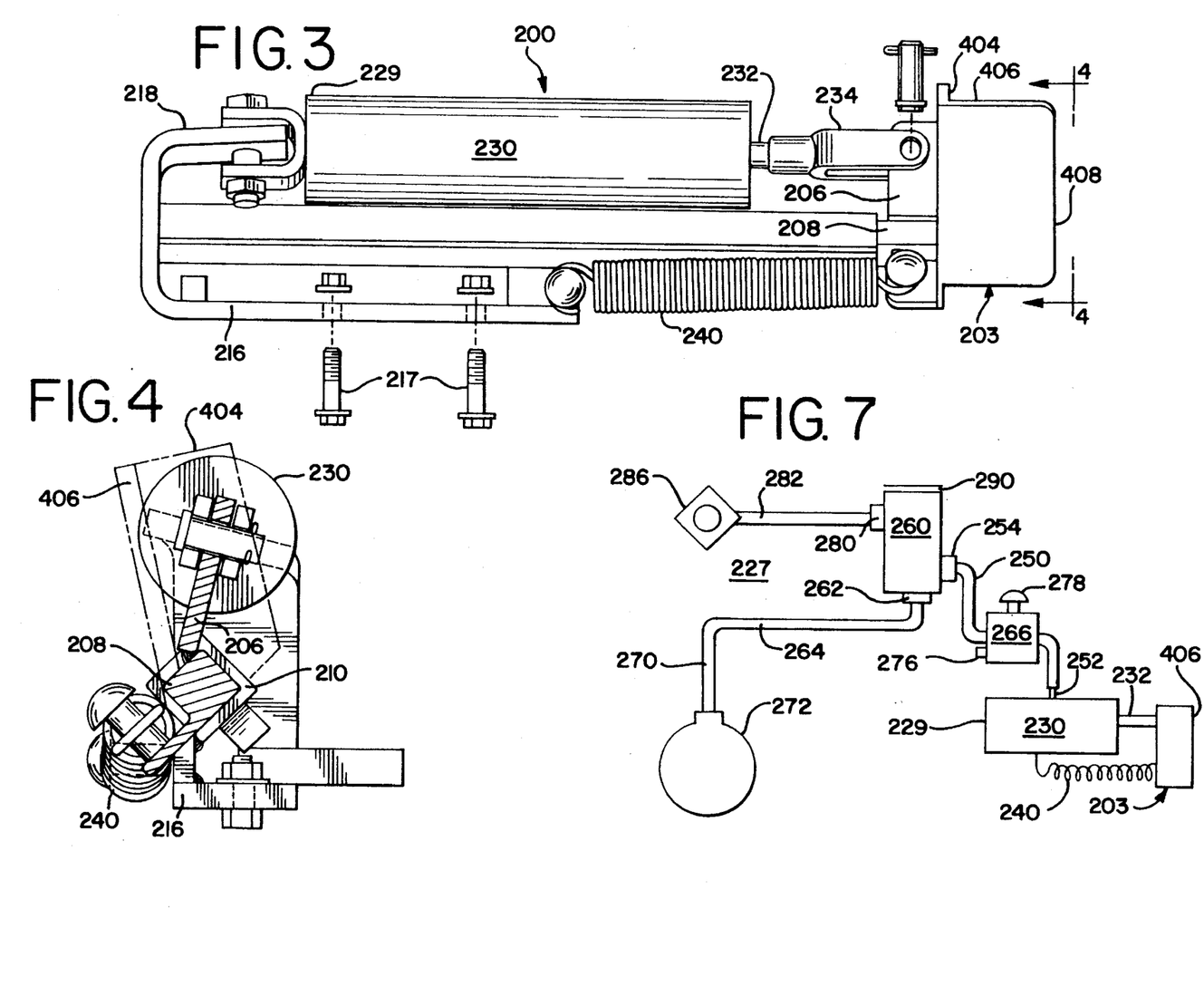
FIG. 3 is a detailed view of a portion of the apparatus shown in FIG. 2 comprising an accessory device with a reciprocable cam.
FIG. 4 is an end view of the accessory device and cam of FIG. 3.
FIG. 7 is a schematic illustration of an energizing and control system for the present invention.
Figure 5:
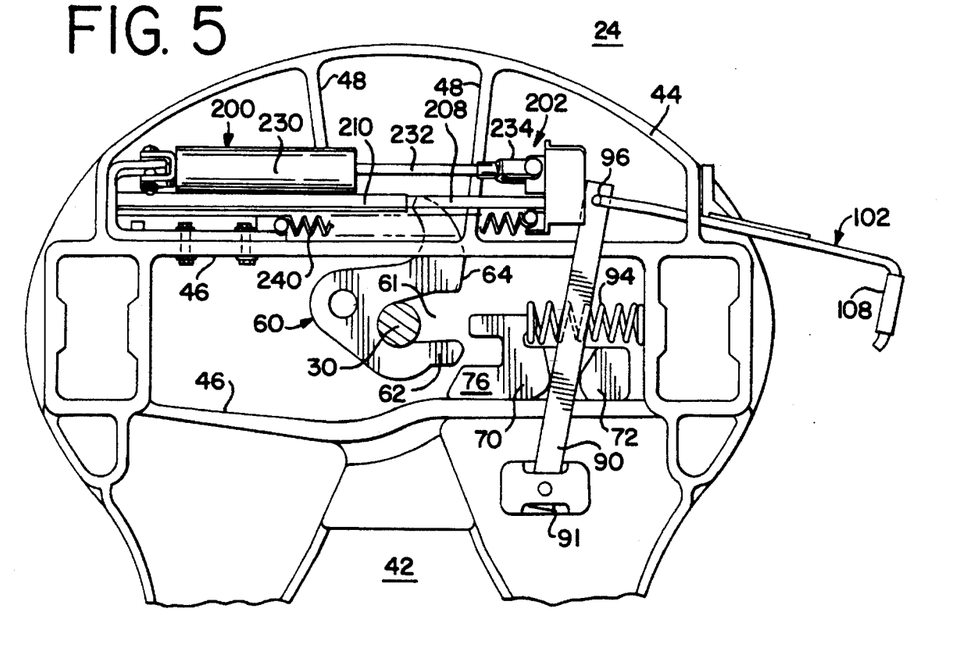
FIG. 5 is a bottom plan view of a fifth wheel similar to FIG. 2 with the cam and operating rod extended and the jaw in a closed but unlocked position.
Figure 6:
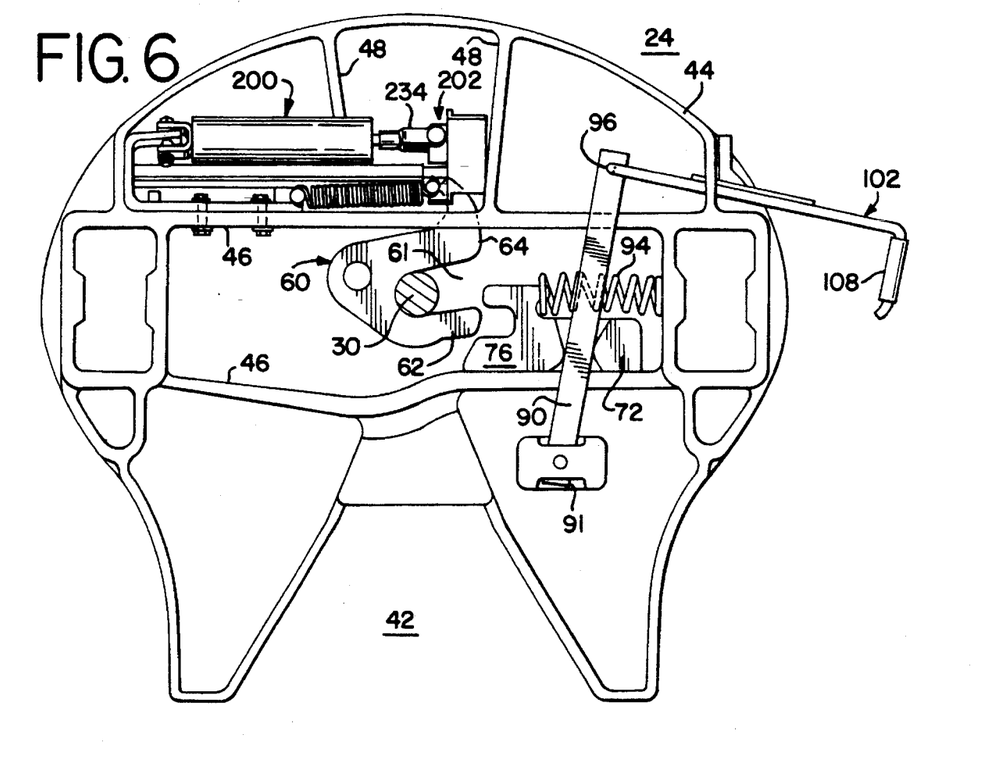
FIG. 6 is a bottom plan view of a fifth wheel similar to FIG. 5 with the cam retracted, the operating rod in the unlocked mode, and the jaw remaining in a closed but unlocked position.

FIGS. 2, 5 and 6 illustrate a fifth wheel 24 generally in accordance with prior U.S. Pat. No. 4,871,182, which fifth wheel 24 has been modified in accord with the teaching of the '396 patent to include a powered accessory 200 having a reciprocable arm 202 engagable with an operating rod 102 of fifth wheel 24. The nomenclature and reference characters of prior U.S. Pat. No. 4,871,182 will be utilized to identify similar parts of fifth wheel 24 in the present disclosure for ease of reference.

Figure 9:
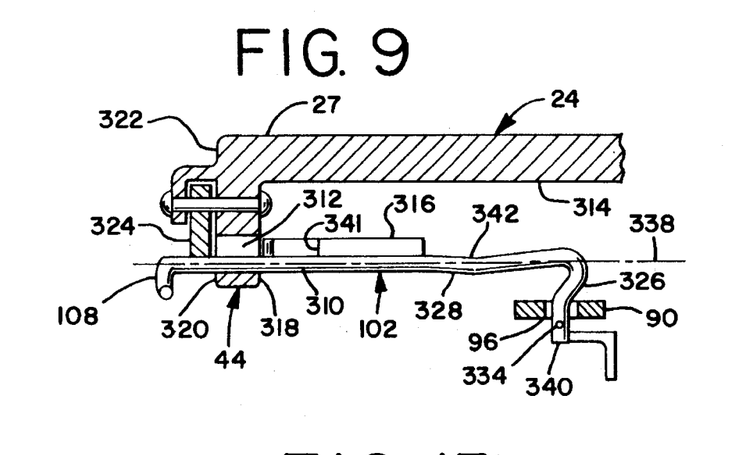
FIG. 9 is an elevational view in partial cross-section of the operating rod and locking lever in a locked position on a fifth-wheel along the line 9—9 in FIG. 8.
Figures 11, 13:
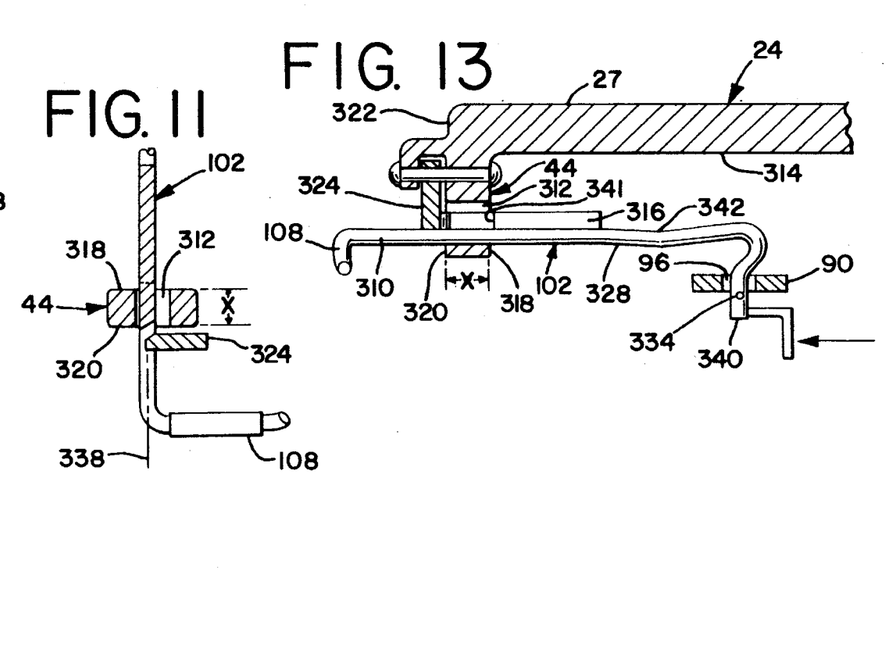
FIG. 11 is an illustration taken along line 11—11 in FIG. 10 at the mating sloped surfaces of the upper rod portion and safety latch at initiation of unlocking.
FIG. 13 is an elevational view in partial cross-section of the operating rod and locking lever at the unlocking position on a fifth-wheel as in FIG. 12.
Figure 12:
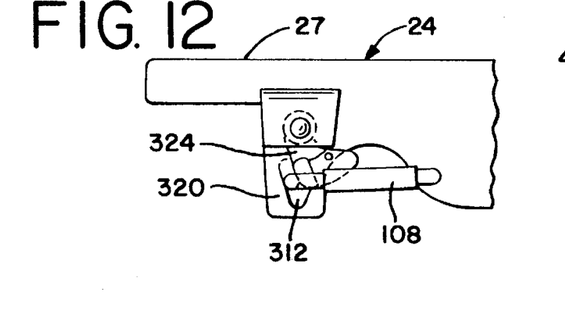
FIG. 12 is an elevational end view showing the operating rod handle and safety latch at the unlocking position.

As seen in FIG. 1, an over-the-road trailer 20 and tractor 22 are connected by mating fifth wheel 24 and kingpin 30 extending from the underside of the forward bed plate (not shown) of trailer 20. Fifth wheel 24 is pivotally mounted on brackets 26 of tractor frame 28. As shown in FIGS. 2, 5 and 6, fifth wheel 24 contains an open "V" slot 42 for receipt (and release) of trailer kingpin 30. The underside 314 of the fifth wheel surface, which is noted in FIGS. 9 and 13, is reinforced with a skirt 44 and, webs 46 and 48. A jaw 60 is pivotally mounted to the underside of the plate and positioned to swing across the apex of the "V" slot 42. Jaw 60 is bifurcated into detent portion 62 and foot portion 64 with opening 61 therebetween. In FIG. 2, jaw 60 is shown in a closed and locked position capturing a reduced neck portion of kingpin 30 to prevent extraction of kingpin 30 from fifth wheel 24. This closed and locked position has trailer 20 relatively forward onto fifth wheel 24, which advances kingpin 30 through slot 42 and against the inner portion of jaw foot 64.

Locking mechanism 70 in FIG. 2 is slidingly engagable with jaw detent 62 when jaw 60 is in the closed position, which locks jaw 60. Locking mechanism 70 with bolt 72 and head 76 is held under fifth wheel 24 by a cover guard (not shown), which head 76 is intersected by locking lever 90, that is pivotally secured at one end 91 to the underside of fifth wheel 24. Compression spring 94 biases bolt 72 to move inwardly toward jaw 60. Thus when kingpin 30 is moved into jaw 60 spring 94 biases bolt 72 and head 76 inwardly to capture detent 62 and also moves locking lever 90 inwardly (counter clockwise as viewed in FIGS. 2, 5 and 6).

The free end of locking lever 90 terminates at eyelet 96 for cooperatively receiving a crank means of operating rod 102, which extends through a port in skirt 44 to handle 108. When compression spring 94 of locking mechanism 70 drives bolt 72 and locking lever 90 counter clockwise, operating rod 102 will be carried in the same direction.

As taught in U.S. Pat. No. 4,871,182, the inner end of operating rod 102 terminates at a follower end, which cooperates with the guide means on the fifth wheel undersurface. The guide means in the '182 patent was preferably in the form of a track or groove having a generally "Z" shaped configuration, which moved locking mechanism 70 successively to locked, intermediate and unlocked positions as rod 102 moved laterally. Locking mechanism 70 is manually movable from locked to unlocked condition through the aforesaid positions by grasping handle 108 and both pulling and twisting rod 102 to move the follower along the legs of the guide means, while the crank of rod 102 correspondingly moves locking lever 90 outwardly (clockwise in the present FIGS. 2, 5 and 6). Cam means and power means were also provided to propel the follower through the same sequence and guide means. In the apparatus illustrated in the '396 patent, reciprocable arm and cam assembly 202 is located to push and turn the follower to trace the lock-unlock path along the legs of the Z-shaped groove.

In the present disclosure at FIGS. 2 to 6 and 19 to 23, arm and cam assembly 202 has a generally "L" shaped boot or cam 203 with ankle portion 206. Heel 404 of cam boot 203 is connected to guide shaft 208, which is slidable along an enclosing guide-way 210 secured to mounting bracket 216. Bracket 216 is bent upon itself to form hook 218 that holds a power means, such as a fluid cylinder 230, with reciprocable shaft 232 generally parallel to guide shaft 208. Clevis 234 at the free end of reciprocable shaft 232 is pinned to ankle portion 206 of cam 203. A cam return means, such as tension spring 240, is connected between cam assembly 202 and mounting bracket 216 to bias cam assembly 202 and reciprocable shaft 232 toward a retracted position with shaft 232 withdrawn into power cylinder 230 when the latter is deactivated. Activation of power cylinder 230 extends shaft 232 and moves cam assembly 202 outward (to the right as seen in the FIGS. 2–6). Preferably, power cylinder 230 is a pneumatic cylinder since virtually all over-the-road tractors have air compressors. However, it is also possible to employ equivalent power sources such as a hydraulic cylinder or an electrical solenoid and the like.

As shown in FIG. 2, powered accessory 200 of FIGS. 3 and 4 is mounted under fifth wheel 24 by securing mounting bracket 216, with bolts 217 or the like, to a major transverse web 46. In the locked position, cam 203 of assembly 202 is retracted and opposite follower end 326, which is noted in FIGS. 9 and 13, of manual operating rod 102. It is to be understood that fifth-wheel radial webs 48 are relatively shallow, as compared to transverse web 46 and cam 203. Guide shaft 208 and guide way 210 are trained along the under edge of radial webs 48. Thus, when power cylinder 230 is energized to extend shaft 232, cam 203 will move outwardly (to the right as viewed in the Figures) and operating rod follower 326 will first ride on cam rounded and leading edge 408, thereby twisting operating rod 102 and moving follower end 326. When cam 203 is advanced, follower 326 will be moved to the right in the Figures, thereby pivoting locking lever 90 outwardly (clockwise) to gradually withdraw locking head 76 from jaw detent 62. Finally, when power cylinder shaft 232 is fully extended, follower end 326 will be fully turned and locking head 76 will be fully disengaged from jaw 60, which pivots jaw 60 and permits separation and withdrawal of kingpin 30 through "V" slot 42 in fifth wheel 24.

Figures 19, 20, 21, 22, 23:
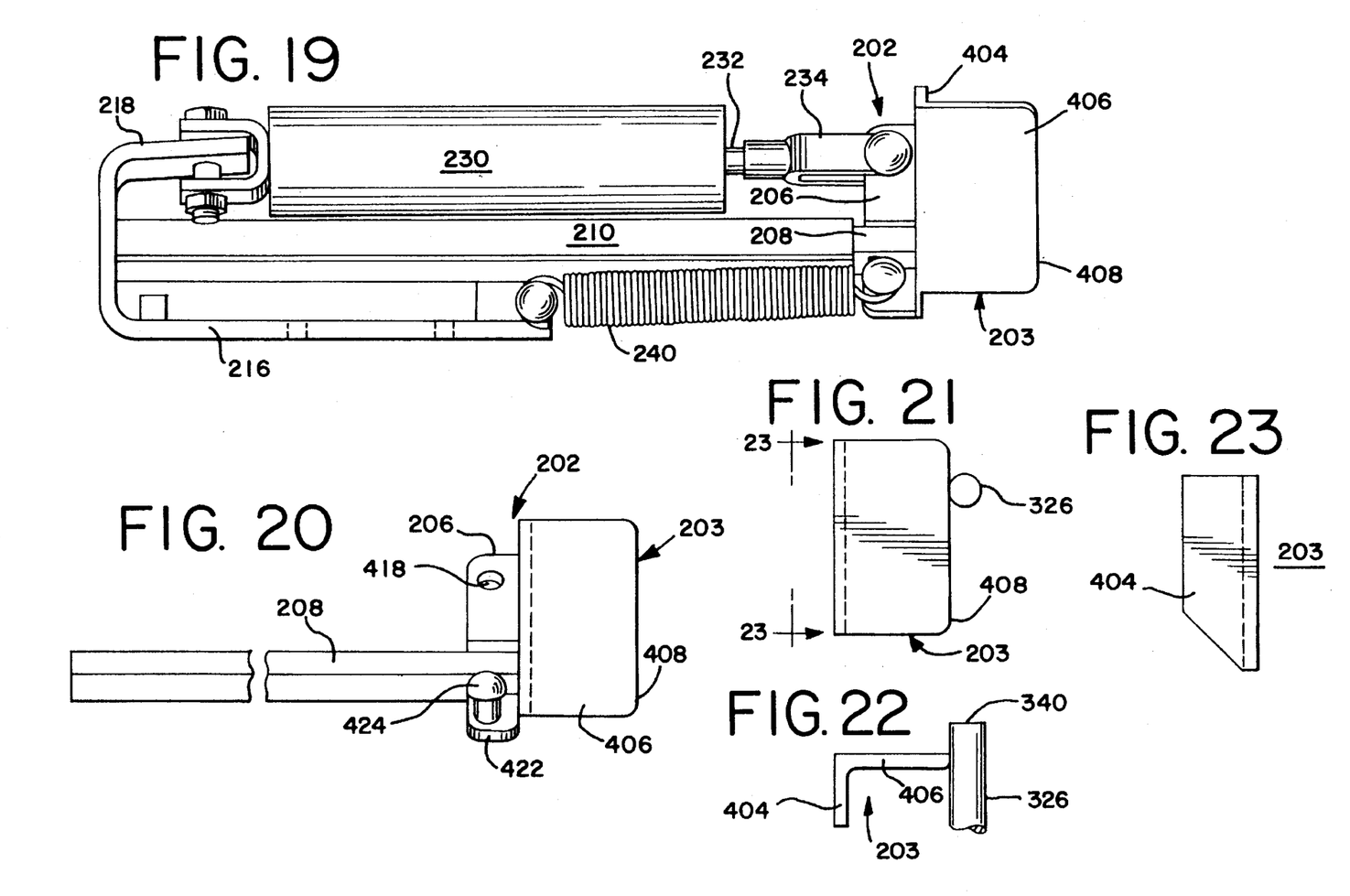
FIG. 19 is a plan view of the preferred embodiment of an air-operated mechanism with a slide and cam for both sliding and rotating the operating rod.
FIG. 20 is a bottom plan view of the slide and cam of FIG. 19.
FIG. 21 is a plan view of the cam of FIG. 20.
FIG. 22 is a side view of the cam of FIG. 21.
FIG. 23 is another view of the cam taken along line 23–23 of FIG. 21.

In the illustrated embodiment at FIG. 22, the plane of larger segment 406 of cam 203 is oriented to be nearly perpendicular to follower end 326 of operating rod 102 at the locked position. This requires cam 203 to be canted with respect to transverse web 46 and to mounting bracket 216, as seen in FIG. 4. Also, power cylinder 230 must be placed across at least one of radial webs 48. To accommodate these two physical constraints, guide way 210 is fastened to mounting bracket 216 at an acute angle as shown in FIG. 4 (rather than at a right angle as simplified in FIGS. 2, 5 and 6). Also, hook 218 of mounting bracket 216 is twisted to hold power cylinder 230 clear of web 48 and aligned with the end of cam ankle portion 206. Further, it is preferred to harden leading edge 408 of cam 203 for smoother contact with follower 326 and for longer wear.

Where power cylinder 230 is pneumatic, as noted in FIG. 7, it is preferred that it be a single-acting operator to extend shaft or driving rod 232 upon introduction of compressed air through single fluid conduit 250, spring-loaded, on-off control valve 266 and fitting 252 into first end 229 of cylinder 230. In that embodiment, shaft 232 and cam 203 will gradually extend and remain fully extended as long as the source of compressed air remains connected to conduit 250 and cylinder 230. Shaft 232 and cam 203 will be withdrawn by tension from spring 240 when valve 266 is disengaged, which permits evacuation of cylinder 230 through fitting 252 and exhaust port 276.

In the present embodiment, control system 227 is schematically illustrated in FIG. 7, with fluid conduit 250 connected to delivery port 254 of inversion valve 260. Supply port 262 on inversion valve 260 is connected through conduit 264 to pressurized air supply line 270 of tractor air compressor 272. Spring-loaded control valve 266 may conveniently be located in the tractor cab and is biased to a normally closed position to inhibit the unwanted passage of air from pressurized line 250. Thus, valve 266 must be manually held open by handle or button 278 to open the connection to high pressure line 270 and to introduce pressurized air into fitting 252. Release of handle 278 closes valve 266 and the connection to inversion valve 260, and simultaneously connects fitting 252 to exhaust port 276 on valve 266.

Control port 280 on inversion valve 260 is connected by conduit 282 to tractor parking brake control valve 286. Inversion valve 260 is a pilot operated two way valve having an internal spring loaded piston (not shown) that operates internally to control air flow between delivery port 254 and supply port 262 and to alternately connect delivery port 254 either to supply port 262 or to exhaust opening 290 at one end of the valve body. The internal piston of valve 260 is driven to close the connection between supply port 262 and delivery port 254, and to connect the latter to exhaust opening 290, when pressurized air is delivered through conduit 282 to control port 280. As an example, a suitable commercially available inversion valve for the control system described is model TR-3 of the Bendix Heavy Vehicle Systems Group of Allied-Signal Inc..

In control system 227 and while the tractor parking brake is not applied, that is during all times that the tractor is capable of movement, pressurized air will be continuously delivered to control port 280, as the usual brake system for tractors 24 is a fail-safe design utilizing pressurized air to maintain the brakes in a disengaged mode. Thus, inversion valve 260 will connect fluid conduit 250 and power cylinder 230 to exhaust opening 290 of inversion valve 260 and will block the supply of pressurized air to power cylinder 230 until the tractor parking brake control valve 286 is engaged. Engagement of valve 286 severs the flow of pressurized air to control port 280, and inversion valve 260 connects conduits 264 and 250, thereby supplying pressurized air to power cylinder 230 as long as spring loaded valve 266 is held open by manual actuation of button 278. Reciprocable cam 203 is extendable to unlock jaw 60, as in FIG. 5, only when the tractor parking brake is engaged. At release of button 278 and closure of control valve 266, tension spring 240 will return cam 203 to the withdrawn position (FIG. 6) and air from power cylinder 230 will be expelled through fitting 252 and exhaust port 276 on control valve 266. Other control circuits and arrangements with double acting cylinders may also be utilized and are functional to actuate accessory device 200.

Figure 24:
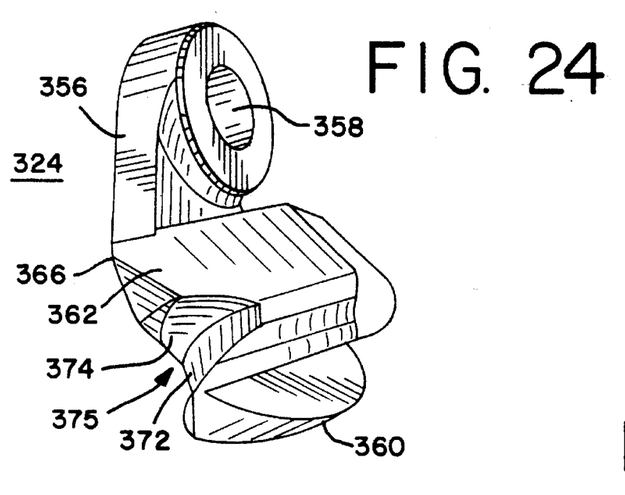
FIG. 24 is a perspective view of the safety latch of the preferred embodiment.
Figure 25:
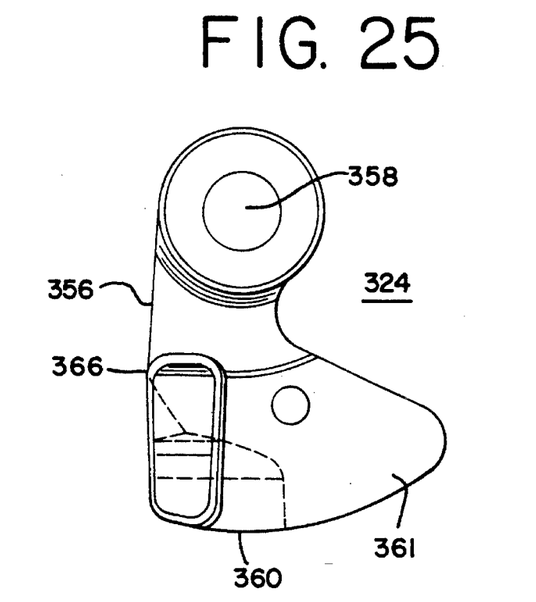
FIG. 25 is an elevational view of the safety latch of FIG. 24.
Figure 26:
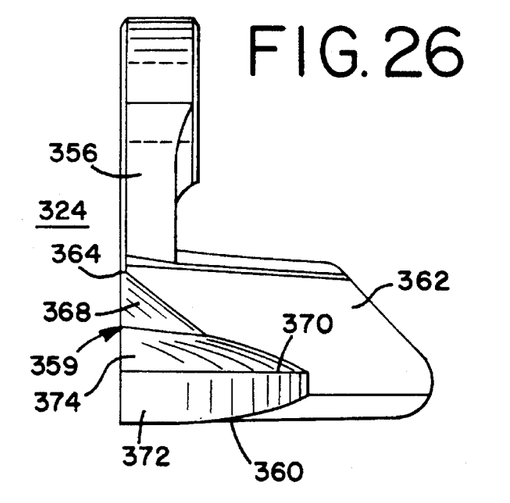
FIG. 26 is a side view of the safety latch of FIG. 25.
Figure 27:
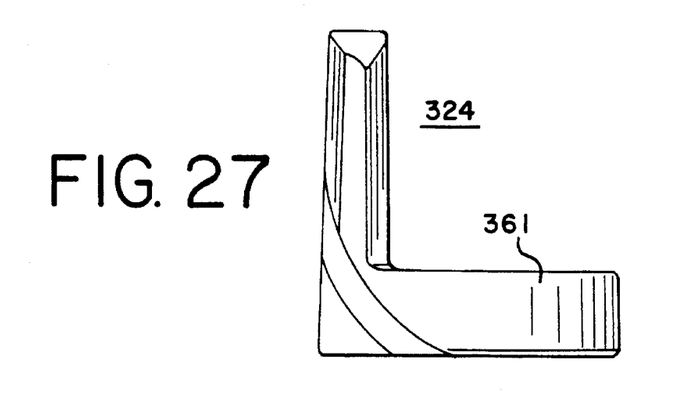
FIG. 27 is a bottom plan view of the safety latch of FIG. 25.

FIG. 9 is a diagrammatic illustration of an operating rod 102 on fifth wheel 24 with upper surface 27 and lower surface 314. Rod 102 includes handle 108 extending from lower rod portion 310 through port 312 in skirt 44. Rod 102 is shown in the locked position and is mounted along lower surface 314 of fifth wheel 24 with upper rod portion 316 positioned above lower portion 310 and inboard of skirt inner wall 318. Handle 108 is in proximity to outboard wall 320 of skirt 44 and perimeter 322 of fifth wheel 24. In this locked position, safety latch 324, which is pivotally mounted on outboard wall 320 of skirt 44 above port 312, has its lower surface or edge 360, noted in FIGS. 24–26, in proximity to handle 108. Further, latch 324 generally covers port 312 and is operable to inhibit movement of operating rod 102 from the locked position.

Figures 8, 10:
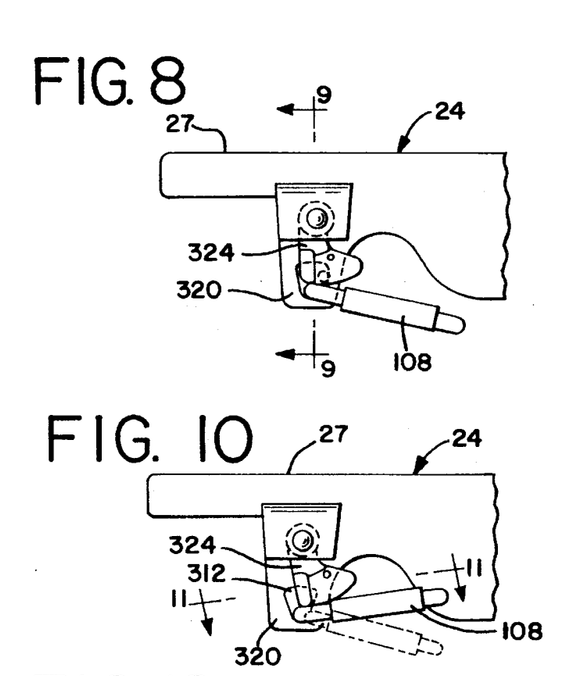
FIG. 8 is an elevational end-view of the handle and safety-latch at the locked and secured position.
FIG. 10 illustrates rotation of the operating rod handle of FIG. 8 to the unlocking position.
Figures 14, 15, 16, 17, 18:
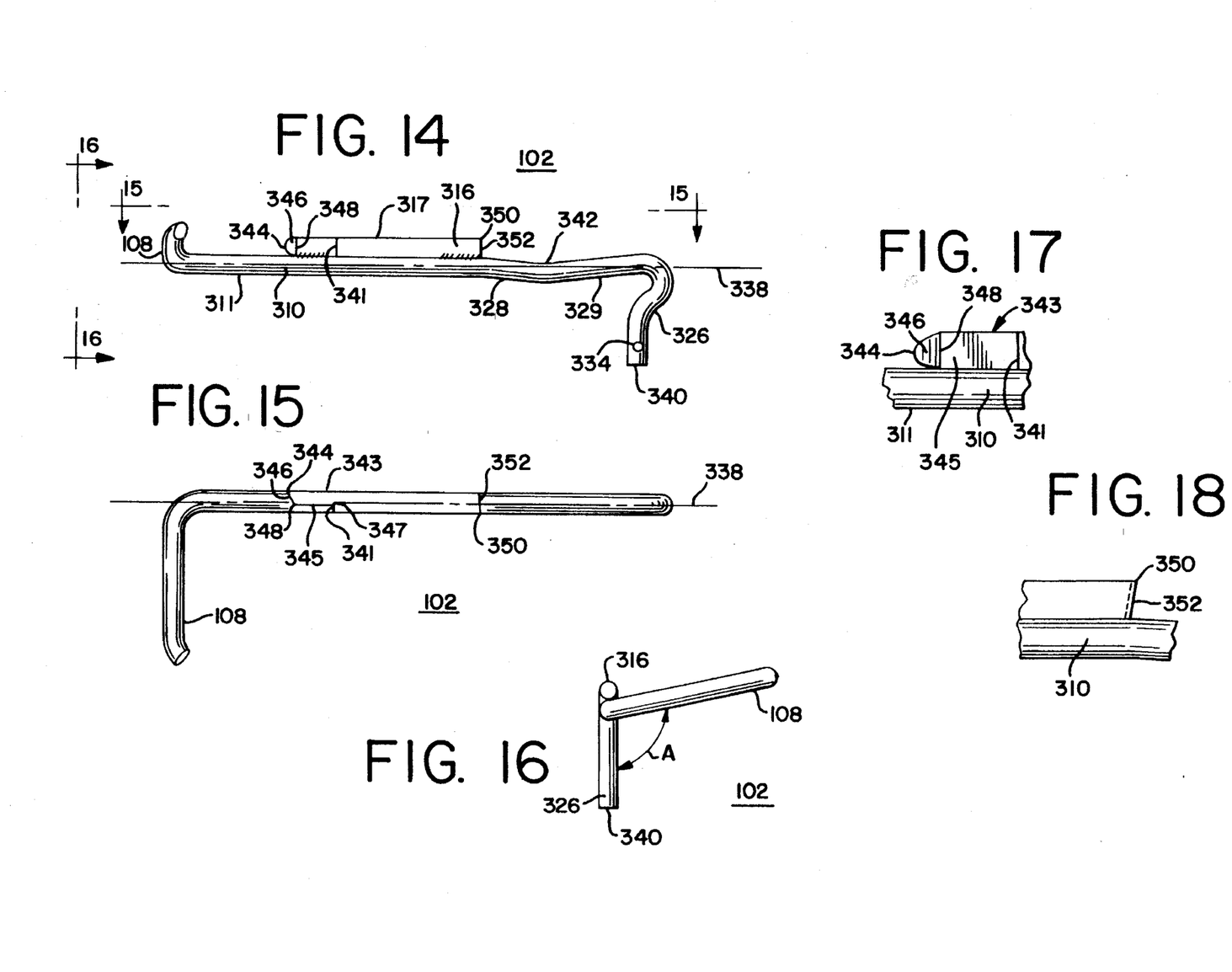
FIG. 14 is an enlarged side view of an operating rod of the present invention.
FIG. 15 is a top plan view of the operating rod in FIG. 14 taken along the line 15—15.
FIG. 16 is a side elevational view of the operating rod of FIG. 14 taken along the line 16—16.
FIG. 17 is an enlarged side view of an angled face of the operating rod in FIG. 14.
FIG. 18 is an enlarged side view of a second angled face of the operating rod in FIG. 14.

The locked or secured position of rod 102 is illustrated in both FIGS. 8 and 9. The weight of handle 108 and its angle from longitudinal axis 338 of lower rod portion 310 contribute to its ability to bias operating rod 102 to the locked position. The angle 'A' of handle 108 in FIG. 16 is about 102° from follower portion 326, which follower portion 326 is structurally and functionally distinguishable from the follower of the '396 patent. In FIG. 9, follower rod portion 326 is coupled to lower portion 310 by coupling segment 328, which follower portion 326 in FIG. 9 is about normal to fifth wheel lower surface 314 and extends through passage 96 of locking lever 90. A narrow securing passage or bore 334 is provided in follower end 326 to receive a securing means (not shown) such as a cotter pin, set screw or rivet, for example.

Operating rod 102 is shown in enlarged illustrations in FIGS. 14 to 18 where lower rod portion 310 is generally cylindrical and has longitudinal axis 338. Follower end 326 has a crook or question-mark profile in FIGS. 9, 13 and 14, however, its lower end 340 is displaced in the plane of the paper from a normal to axis 338 at an angle of about 3° (three degrees). Coupling portion 328 is shown with a deflection, or "kink", formed at point 342 by a downward inclination from lower rod portion 310 and an upwardly inclined portion extending to follower end portion 326.

Upper rod portion 316 in FIGS. 14 and 15 has a leading end 341 with a projection or finger 343 extending therefrom. In the illustration, rod 316 is generally cylindrical and is secured to rod lower portion 310. Finger 343 is shown as a cylindrical shape cut along its longitudinal axis to provide a half cylinder with face 345, which face 345 intersects leading end 341 generally at a right angle to provide a shoulder or notch 347 at this intersection. Upper rod portion 316 in FIG. 14 is positioned above lower rod portion 310 and secured to its outer surface 311 by welding, forming or other means. Skirt 44 in FIG. 13 has a wall thickness x between inner surface 318 and outer surface 320, and as noted finger 343 and face 345 have a length about equal to wall thickness x. In this position, leading end 341 contacts inner surface 318 to limit the travel of rod 102 during initiation of engagement. Thus, leading edge 341 serves as a safety means to prevent overtravel of rod 102, inadvertent release of kingpin 30, and consequent unexpected release of trailer 20.

Upper rod portion 316 and more specifically finger 343 has first end 344 in proximity to handle 108 and sloped surface 346, as noted in FIGS. 14, 15 and 17. Sloped surface 346 in FIGS. 14 and 17 has back edge 348 horizontally displaced at a small compound angle and a short distance (shown as 0.16 inch) from both handle 108 and first end 344 at surface 311. This small angle or short distance provides first end 344 as a leading edge for sloped surface 346 and thus for upper rod portion 316 at contact with safety latch 324. Second or inboard end 350 of upper rod portion 316 is shown in an enlarged view in FIG. 18 with a second sloped and tapered surface 352. In FIG. 18, this sloped and tapered surface is noted as tapering from the top to the bottom of upper rod 316 only 0.09 inch (nine-hundredths inch) and as having its rearward surface displaced 0.06 inch from the forward tapering edge. Thus, it is noted that this provides a slightly angled surface from a surface normal to axis 338. Tapered surface 352 is utilized to ease the transfer of operating rod 102 between locked and unlocked positions at skirt outer face 320. Alternatively, first sloped surface 346 provides a smooth driving contact surface for engagement and movement of safety latch 324 to its unlocked position, which allows freedom of movement for operating rod 102. However, as noted above, movement of rod 102 to the unlocked position of FIG. 6 requires a double movement of handle 108. The initial movement provides engagement of first edge 344 with latch 324 and the second movement provides disengagement of face 341 or its movement past inner wall 318 to allow continuing sliding motion of rod 102 to the unlocked position.

As shown in FIGS. 24–27, safety latch 324 has upright arm 356 with cross bore 358 for pivotally mounting latch 324 on skirt outer wall 320. In this mounted position, latch 320 is freely pivotable to the locked and secured position where lower edge 360, which is noted as an arc surface at the base of wall 361, is in contact or in proximity to handle 108 and lower rod portion 310 as well as covering port 312, to inhibit operating rod 102 transfer to the unlocked position. Latch 324 includes knob or protuberance 362 protruding from arm 356, and wall 361. Inner wall face 364 is in proximity to skirt outer wall 320 and the intersection of protuberance 362 with wall 361 provides forward or leading edge 366.

A sequence of sloped and arced surfaces along forward edge 366 cooperate to provide a transitional slot for smooth operation of latch 324 with rod 102 between the locked and unlocked positions. A sloped, tapered and generally triangular appearing face 368 is provided on protuberance 362 just below (as shown in the Figures) its intersection with arm 356. A compound arced slot at forward edge 366 extends into protuberance 362. More specifically, a first and lower arc 372 at arc surface 359 is provided in protuberance 362 around edge 366 from inner wall face 364, which arc 372 is shown as inwardly tapered from lower edge 360 to an arc junction 370. A similar second and upper arc 374 is downwardly tapered from the lower edge triangular face 368 to intersect with arc junction 370. The tapered arcs 372 and 374 cooperate to broadly form an arced groove 375 in FIG. 24 to receive upper rod leading edge 344 and surface 346 to provide a smooth, non-binding, contacting and driving surface for upper rod 316 during the unlocking operation.

In this unlocking operation, mating surfaces 346 and arced groove 375 slidingly contact during lateral translation of operating rod 102 to slide past each other and pivot latch 324 to the unlocked position, which contact into the unlocked position is diagrammatically shown in FIGS. 11 and 13. Operating rod 102 is movable and operable in the usual manner by movement of safety latch 324, through counter clockwise (as in FIGS. 8 and 10) rotation of handle 108 to move upper and lower rod portion 316 and 310, respectively. This counter clockwise rotation of rod 102 provides adequate clearance for edge 341 to avoid inner skirt face 318 and thus to allow passage of rod upper portion into and through port 312. Thereafter, operating rod 102 may be pulled outward from skirt 44 to move locking lever 90, which is noted in FIGS. 2, 5 and 6, to the unlocked position. Subsequently, upper rod portion 316 is rotated to move second end 350 to contact skirt outer wall 320 and secure the unlocked position.

Automatic operation of rod 102 is provided by powered accessory assembly 200 of FIG. 19 with reciprocable cam 203 shown in FIGS. 21, 22 and 23. Cam 203 has a generally "L" shaped profile with upper leg 404 and lower leg 406 as noted in FIG. 22. Lower leg 406 is wider than the height of leg 404 and has leading edge 408 to contact operating rod follower end 326 near its lower end 340. Cam 203 is secured to yoke or clevis 234, which is mounted on piston 232 of fluid cylinder mechanism 230, by fastener or ankle plate 206 and clevis pin 416, as noted in FIG. 19. Slide arm 208 in FIG. 20 has fastener plate 206 secured to upper leg 404. Passage 418 of plate 206 is matable with clevis pin 416 to secure yoke 234 at the end of piston 232. Second fastening plate 422 with rivet 424 is also mounted on leg 404, to connect slide arm 208 and return spring 240 to mounting bracket 216, which spring 240 biases piston 232, and thus cam 203, to the normally withdrawn position in cylinder 230.

At actuation of air-operated actuator 230, such as by circuit 227 of FIG. 7 in the manner described above, piston 232 advances outwardly from actuator 230. As noted in FIGS. 19, 21, and 22, round leading edge 408 of cam 203 contacts follower end 326 in proximity to its end 340. As operating rod 102 is constrained to lateral and rotational movement as cam 203 advances, and as the slight 3° angle of follower end 326 from normal to rod 310 reduces movement of end 326 along edge 408, a rotational force component is provided to rod 102 to move upper rod portion 316 into the unlocking position. Engagement of first upper rod portion end 344 with safety latch 324 and the continued lateral movement of piston 232 against cam 203 and operating rod 102, moves rod 102 and locking lever 90 to the unlocked position. Full extension of piston 232 and the final rotation of operating rod 102 moves upper rod portion second end 350 to engage skirt outer wall 320 and secures latch 324 and rod 102 at the unlocked position.

While only specific embodiments of the invention have been described and shown, it is apparent that various alternatives and modifications can be made therein. It is, therefore, the intention in the appended claims to cover all such modifications and alternatives as may fall within the true scope of the invention.

We claim:

1. In a fifth wheel apparatus, a fifth wheel having a king pin securing jaw, a locking assembly operable between a locked and unlocked position, which assembly has a safety latch, an operating rod mechanism for automatic disengagement of said safety latch and translation of said assembly and jaw to an unlocked position, said operating rod mechanism comprising:

an operating rod with a handle, an upper-rod portion, a lower-rod portion, a coupling portion and a formed segment connecting said lower-rod portion and said coupling portion;

said fifth wheel having a skirt with an inner wall surface and an outer wall surface, said skin defining a through-pod, said rod extending through said skirt through-port;

a lever bar connected to said securing jaw, said lever bar defining a passage, said operating-rod coupling portion extending through said passage;

said upper-rod portion mounted on said lower-rod portion in proximity to said fifth wheel, which upper portion has a first end and a second end, one of said first and second ends having a first sloped surface;

said safety latch pivotally mounted on said skin outer wall surface and operable to contact said rod to secure said operating rod and locking assembly at said locked position, said safety latch defining a second sloped surface, which second sloped surface is alignable and engageable with said upper-rod-portion first sloped surface;

means for moving said operating rod to a jaw unlocked position for disengagement of said king pin, said operating-rod coupling portion freely moving between said moving means and said skirt inner wall surface, said moving means actuatable to contact said coupling portion and move said operating rod, said lever bar and said securing jaw from said locked position to said unlocked position, which rod movement engages said upper-rod-portion first sloped surface and said safety-latch second sloped surface to pivot said safety latch from said locked position, said moving means synchronously rotating said operating rod to position said upper portion for sliding translation through said port and for rotation to secure said safety latch at said unlocked position.

2. An operating rod mechanism for a fifth wheel apparatus as claimed in claim 1, said means for moving further comprising a driving rod with a first end, a cam coupled to said driving rod first end, said driving rod and cam generally movable transversely to said rod-coupling portion to engage said operating rod coupling portion and move said operating rod in said transverse direction to induce rotational movement of said operating rod for alignment of said upper-rod portion first sloped surface and said safety-latch second sloped surface.

3. An operating rod mechanism for a fifth wheel apparatus as claimed in claim 2, said driving rod cam having an outer wall and a generally flat segment approximately normal to said outer wall, said flat segment operable to contact, laterally move and rotate said operating rod to said unlocked position.

4. An improved fifth wheel apparatus for an over the road tractor, said apparatus having a fifth wheel with an upper surface and a lower surface, and a locking lever movable between locked and unlocked positions by an operating rod to open a king pin locking jaw, the improvement comprising:

said fifth wheel having an outer perimeter with a skirt extending about normal from said fifth-wheel lower surface in proximity to said perimeter, said skirt having an inner surface, an outer surface and defining an operating rod port;

said locking jaw generally centrally located in said fifth wheel;

said operating rod having a lower-rod portion, an upper-rod portion, a coupling portion, a formed segment connecting said lower-rod and coupling portions, and a handle, said lower-rod portion, upper-rod portion and formed segment in proximity to said fifth-wheel lower surface and radially extending inward from said skirt generally toward said locking jaw at said locking lever locked position, said lower-rod portion and handle extending through said operating-rod port;

a safety latch mounted on said skirt and pivotable between a first position to secure said operating rod in said locked position, and a second position permitting sliding lateral translation and at least partial rotation of said rod in said port, said safety latch having a camming slot;

said upper rod portion mounted on said lower rod portion and having a first end and a second end, one of said first and second ends having a first camming surface engageable with said latch camming slot;

means for moving said operating rod;

said locking lever defining a passage, said operating rod coupling portion extending through said locking lever passage and generally perpendicular to said fifth wheel lower surface, said operating rod coupling portion freely moving between said moving means and said skirt inner surface, said operating rod laterally movable generally parallel to said lower surface through said skirt pod by said moving means to disengage said locking lever and locking jaw, to rotate said coupling portion and operating rod for engagement of said latch camming slot and upper portion camming surface for pivoting said safety latch to an unlocked position by said lateral movement of said operating rod.

5. A fifth wheel apparatus as claimed in claim 4, said means for moving further comprising a driving rod having a first end, and movable between a locking position and an unlocking position, a second camming surface at said driving rod first end, which driving rod is movable to engage said second camming surface with said coupling portion to laterally move said operating rod generally parallel to said fifth wheel lower surface and to rotate said operating rod lower portion in said port for alignment of said first latch camming surface and said camming slot.

6. A fifth wheel apparatus as claimed in claim 5 wherein said handle is affixed to said operating rod lower portion in proximity to said skirt outer surface and biases said operating rod to the locked position.

7. A fifth wheel apparatus as claimed in claim 5, wherein said operating rod is generally cylindrical and has an outer wall, said operating rod having a flat edged surface in proximity to said driving rod first end and about perpendicular to said outer wall, a camming surface extending from said driving rod flat edged surface.

8. A fifth wheel apparatus as claimed in claim 4 wherein said means for moving is a fluid-operable cylinder.

9. A fifth wheel apparatus as claimed in claim 8 wherein said cylinder includes said driving rod, which is reciprocable therein.

10. A fifth wheel apparatus as claimed in claim 8, further comprising means for actuating said fluid-operated cylinder, which actuating means is remote from said apparatus.

11. A fifth wheel apparatus as claimed in claim 4 wherein said operating rod is operable by one of manual operation and said means for moving said operating rod.

12. A fifth wheel apparatus as claimed in claim 10 wherein said over the road tractor has means for compressing;

said means for actuating having a fluid control circuit with means for coupling and a manually-operable, normally-closed control valve with a manual actuator, an exhaust port, said valve coupled between said fluid-operated cylinder and said means for compressing by said coupling means, said manual actuator operable to open said valve and couple said cylinder and said compressing means to communicate compressed fluid to said cylinder to move said driving rod and cam and to open said fifth wheel securing means.

13. A fifth wheel apparatus as claimed in claim 12 wherein release of said manual actuator is operable to close said valve and couple said cylinder to said exhaust port to evacuate said fluid from said cylinder and permit retraction of said driving rod.

14. A fifth wheel apparatus as claimed in claim 13 wherein said tractor further comprises a parking brake;

said control circuit having an inversion valve coupled between said means for compressing and said control valve, and further coupled to said parking brake, said inversion valve operable to communicate said fluid from said compressing means to engage said parking brake.

15. A fifth wheel apparatus as claimed in claim 12 wherein said fluid cylinder has means for biasing said driving rod to a reference position wherein said rod is retracted in said cylinder.

* * * * *